UNITED STATES PATENT OFFICE.

RUPERT GREVILLE-WILLIAMS, OF ALBANY, NEW YORK, ASSIGNOR TO THE ALBANY COAL TAR DYE AND CHEMICAL COMPANY, OF SAME PLACE.

COMPOUND ORCIN DYE.

SPECIFICATION forming part of Reissued Letters Patent No. 11,016, dated July 30, 1889.

Original No. 404,331, dated May 28, 1889. Application for reissue filed July 3, 1889. Serial No. 316,484.

*To all whom it may concern:*

Be it known that I, RUPERT GREVILLE-WILLIAMS, a subject of Her Majesty the Queen of Great Britain, and a resident of Albany, in the county of Albany and State of New York, have invented certain new and useful Improvements in the Manufacturing of Coloring-Matter, of which the following is a specification.

My invention relates to the production of new coloring-matters obtained by the action of one molecule of tetrazo-diphenyl or tetrazo-ditolyl or their sulpho-acids on first one molecule of naphthylamine, or on one of the present known sulpho-acids of naphthylamine, and then acting on the intermediate product with one molecule of orcin or its sulpho-acids. The colors produced in this manner are much faster against light than those produced by the use of two molecules of orcin on one molecule of tetrazo-diphenyl or tetrazo-ditolyl. (See Patent No. 394,425, December 11, 1888.) The following formulæ will show the difference in their composition: Tetrazo-diphenyl+naphthionic acid+orcin—

$$\begin{array}{c} NH_2 \\ | \\ C_6H_4N{:}NC_{10}H_5SO_2ONa \\ C_6H_4N{:}NC_6H_2ONa \\ \diagup\ \diagdown \\ CH_3\ \ ONa \end{array}$$

Tetrazo-diphenyl+orcin (two molecules)—

$$\begin{array}{c} CH_3\ \ ONa \\ \diagdown\ \diagup \\ C_6H_4N{:}NC_6H_2ONa \\ C_6H_4N{:}NC_6H_2ONa \\ \diagup\ \diagdown \\ CH_3\ \ ONa \end{array}$$

The following are examples of how I practically carry out my invention:

Twenty-eight (28) pounds of benzidine sulphate or its equivalent of the base are converted into its tetrazo compound in the usual and well-known manner. The solution is then run into twenty-five (25) pounds of the soda salt of the monosulpho-acid of beta-naphthylamine and forty (40) pounds of acetate of soda dissolved in five hundred (500) gallons of water. The mixture is stirred for twelve (12) hours and then one hundred (100) pounds of caustic soda and fourteen and two-tenths (14.2) pounds of orcin dissolved in water are added. The stirring is continued for fifteen (15) hours longer. The temperature is then raised to boiling and the color salted out, filtered off, pressed, and dried. The color thus produced is a yellow shade of red.

Example II: If tolidine be used instead of benzidine in example I, a much bluer shade is obtained.

Example III: If an equivalent of sulpho-acid of benzidine be substituted for the sulphate or base, the color produced withstands the action of dilute acids better than the color produced by example I, but is hardly as fast to soap.

Example IV: If Cassella's naphthionic acid F be substituted for the soda salt of the sulpho-acid of beta-naphthylamine in examples I, II, and III, the shade of the color obtained is bluer still.

Example V: The beta-naphthylamine sulpho-acid soda salt in examples I, II, III, and IV may be replaced by one molecule of the mono or di sulpho-acids of alpha-naphthylamine or a molecule of beta-naphthylamine disulpho-acid. The colors produced by the above process are insoluble in dilute acids, but are soluble in concentrated sulphuric acid. They dye unmordanted cotton red in an alkaline or soap bath.

What I claim as my invention, and desire to secure by Letters Patent, is—

The process of producing new coloring-matters, which consists in combining one molecule of tetrazo-diphenyl or tetrazo-ditolyl or their sulpho-acids with first one molecule of naphthylamine or one of the present known sulpho-acids of naphthylamine, and then combining this intermediate product with one molecule of orcin or sulpho-acids of the same, substantially as set forth.

Signed at the city of Albany, in the county of Albany and State of New York, this 19th day of June, 1889.

RUPERT GREVILLE-WILLIAMS.

Witnesses:

HOWARD S. NEIMAN,

R. A. SHAW.